United States Patent
Edme et al.

(10) Patent No.: US 9,753,167 B2
(45) Date of Patent: Sep. 5, 2017

(54) CALIBRATING ROTATION DATA AND TRANSLATIONAL DATA

(75) Inventors: Pascal Edme, Cambridge (GB); Everhard Johan Muyzert, Girton (GB)

(73) Assignee: WESTERNGECO L.L.C., Houston, TX (US)

( * ) Notice: Subject to any disclaimer, the term of this patent is extended or adjusted under 35 U.S.C. 154(b) by 1295 days.

(21) Appl. No.: 13/556,034

(22) Filed: Jul. 23, 2012

(65) Prior Publication Data

US 2014/0022861 A1    Jan. 23, 2014

(51) Int. Cl.
 G01V 1/36    (2006.01)
 G01V 13/00    (2006.01)

(52) U.S. Cl.
 CPC .............. *G01V 1/36* (2013.01); *G01V 13/00* (2013.01)

(58) Field of Classification Search
 CPC ... G01V 1/40; G01V 1/00; G01V 1/28; G01V 1/366; G01V 2210/32; G01V 1/30; G01V 1/364; G06F 19/00
 USPC ........................................ 367/59; 702/11, 14
 See application file for complete search history.

(56) References Cited

U.S. PATENT DOCUMENTS

| | | | | | |
|---|---|---|---|---|---|
| 2,657,373 | A | * | 10/1953 | Piety | G01V 1/16 367/58 |
| 4,723,231 | A | * | 2/1988 | Sallas | G01V 1/006 181/108 |
| 5,555,530 | A | * | 9/1996 | Meehan | 367/45 |
| 5,757,720 | A | * | 5/1998 | Soubaras | 367/13 |
| 2003/0002388 | A1 | * | 1/2003 | Mandal | G01V 1/44 367/25 |
| 2006/0197532 | A1 | * | 9/2006 | Eidesmo et al. | 324/334 |
| 2006/0253256 | A1 | * | 11/2006 | Robertsson et al. | 702/14 |
| 2009/0262602 | A1 | * | 10/2009 | Robinson | 367/43 |
| 2010/0114492 | A1 | * | 5/2010 | Zhao et al. | 702/7 |
| 2010/0195439 | A1 | * | 8/2010 | Muyzert | 367/56 |
| 2010/0274489 | A1 | * | 10/2010 | Horne | 702/11 |
| 2011/0080808 | A1 | | 4/2011 | Muyzert et al. | |
| 2011/0082647 | A1 | * | 4/2011 | Edme et al. | 702/17 |
| 2011/0292760 | A1 | * | 12/2011 | Hayes | 367/20 |
| 2012/0113749 | A1 | | 5/2012 | Edme et al. | |
| 2012/0250460 | A1 | * | 10/2012 | Edme et al. | 367/45 |
| 2013/0088939 | A1 | | 4/2013 | Edme et al. | |
| 2014/0288837 | A1 | | 9/2014 | Edme et al. | |

FOREIGN PATENT DOCUMENTS

WO    2012015520    2/2012

OTHER PUBLICATIONS

Soubaras, R., "Calibration and Deghosting of Ocean Bottom Hydrophone and Geophone Measurements", 58th EAGE Conference, Jun. 3-7, 1996 (2 pages).
Robertsson, J.O.A., et al., "Wavefield separation using densely deployed three-component single-sensor groups in land surface-seismic recordings," Geophysics, vol. 67, No. 5 (Sep.-Oct. 2002); p. 1624-1633, 6 Figs (10 pages).

(Continued)

*Primary Examiner* — Luke Ratcliffe
*Assistant Examiner* — Amie M N'Dure

(57) ABSTRACT

Rotation data and translational data are received. A calibration operator is determined based on the rotation data and translational data, where the calibration operator is useable to relatively calibrate the rotation data and the translation of data.

20 Claims, 6 Drawing Sheets

(56) References Cited

OTHER PUBLICATIONS

Ivanpour, K., et al., Local Velocity Analysis by Parametric Wavenumber Estimation in Seismic (FK-Music), WesternGeco, Schlumberger House, Solbraveien 23, N-1372 Asker, Norway, Schlumberger Cambridge Research, WesternGeco (4 pages).
Sheriff and Geldart, Data Processing, Correlation, Chapter 9, p. 284-291 (8 pages).
International Search Report and Written Opinion of PCT Application No. PCT/US2013/050778 dated Oct. 15, 2013: pp. 1-11.
Examination Report for the equivalent GCC patent application 2012-24993 issued on Nov. 27, 2016.

* cited by examiner

CALIBRATING ROTATION DATA AND TRANSLATIONAL DATA

BACKGROUND

Seismic surveying is used for identifying subterranean elements, such as hydrocarbon reservoirs, freshwater aquifers, gas injection zones, and so forth. In seismic surveying, seismic sources are placed at various locations on a land surface or seafloor, with the seismic sources activated to generate seismic waves directed into a subterranean structure.

The seismic waves generated by a seismic source travel into the subterranean structure, with a portion of the seismic waves reflected back to the surface for receipt by seismic sensors (e.g., geophones, accelerometers, etc.). These seismic sensors produce signals that represent detected seismic waves. Signals from the seismic sensors are processed to yield information about the content and characteristic of the subterranean structure.

A typical land-based seismic survey arrangement includes deploying an array of seismic sensors on the ground. Marine surveying typically involves deploying seismic sensors on a streamer or seabed cable.

SUMMARY

In general, according to some implementations, rotation data and translational data are received. A calibration operator is determined based on the rotation data and translational data, where the calibration operator is useable to relatively calibrate the rotation data and the translation of data.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
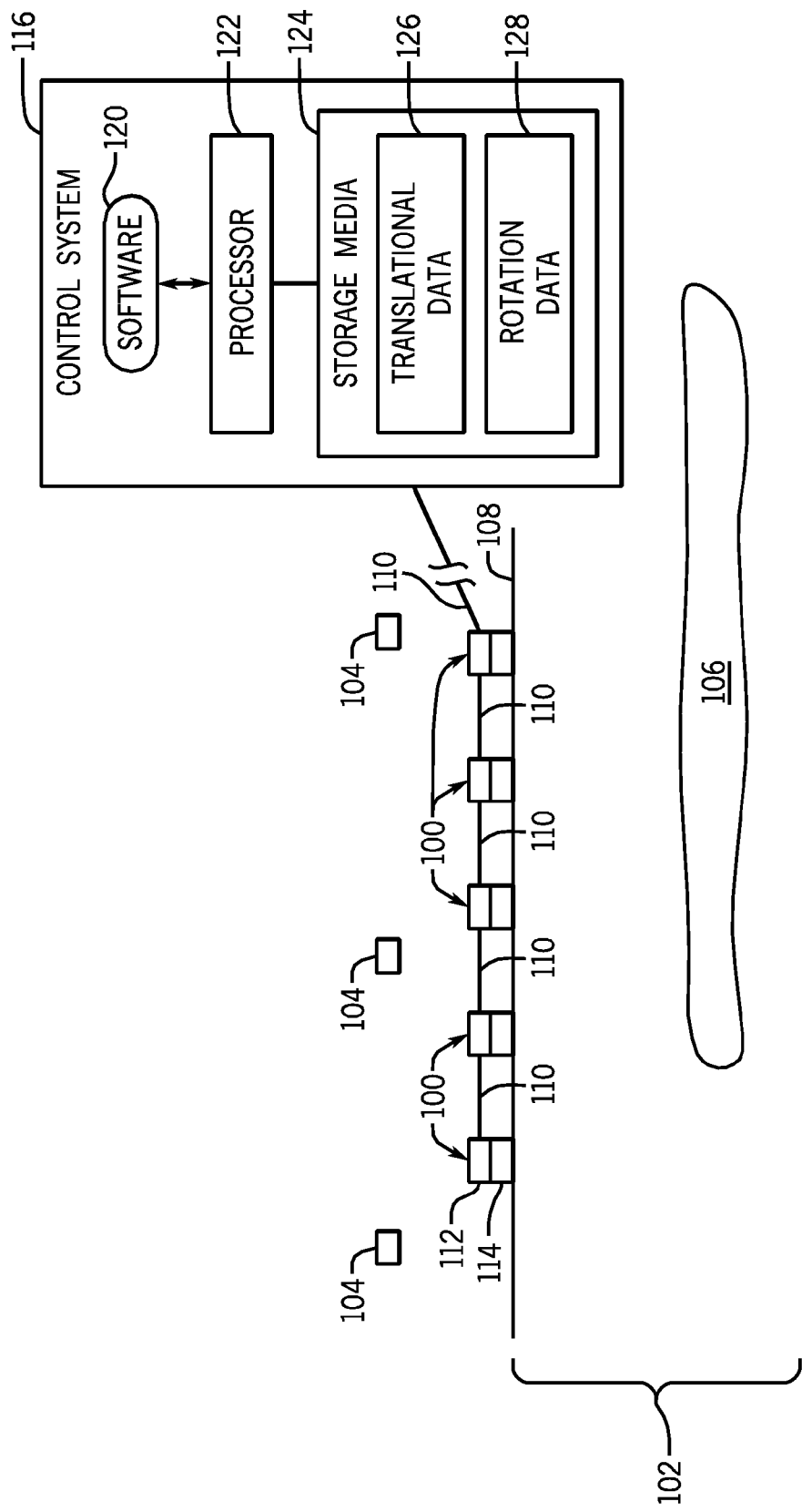
FIG. 1 is a schematic diagram of an arrangement of sensor assemblies that can be deployed to perform seismic surveying, according to some embodiments.

In seismic surveying (marine or land-based seismic surveying) of a subterranean structure, seismic sensors are used to measure seismic data, such as displacement, velocity or acceleration data. Seismic sensors can include geophones, accelerometers, MEMS (microelectromechanical systems) sensors, or any other types of sensors that measure the translational motion (e.g., displacement, velocity, and/or acceleration) of the surface at least in the vertical direction and possibly in one or both horizontal directions. Such sensors are referred to as translational survey sensors, since they measure translational (or vectorial) motion. The data acquired by such sensors is referred to as translational data.

Each seismic sensor can be a single-component (1C), two-component (2C), or three-component (3C) sensor. A 1C sensor has a sensing element to sense a wavefield along a single direction; a 2C sensor has two sensing elements to sense wavefields along two directions (which can be generally orthogonal to each other, to within design, manufacturing, and/or placement tolerances); and a 3C sensor has three sensing elements to sense wavefields along three directions (which can be generally orthogonal to each other).

A seismic sensor at the earth's surface can record the vectorial part of an elastic wavefield just below the free surface (land surface or seafloor, for example). When multicomponent sensors are deployed, the vector wavefields can be measured in multiple directions, such as three orthogonal directions (vertical Z, horizontal inline X, horizontal crossline Y). In marine seismic survey operations, hydrophone sensors can additionally be provided with the multicomponent vectorial sensors to measure pressure fluctuations in water.

In some implementations, it can also be useful to measure rotation data. Rotation data refers to the rotational component of the seismic wavefield, and can be measured by a rotational sensor in some examples. As an example, one type of rotational sensor to measure rotation data is the R-1 rotational sensor from Eentec™, located in St. Louis, Mo. In other examples, other rotational sensors can be used. It is assumed that both the rotational sensor output and the seismic sensor output have been corrected for the instruments' impulse response although this does not have to be performed in some examples.

Rotation data refers to a rate of a rotation (or change in rotation over time) about an axis, such as about the horizontal inline axis (X) and/or about the horizontal crossline axis (Y) and/or about the vertical axis (Z). In the marine seismic surveying context, the inline axis X refers to the axis that is generally parallel to the direction of motion of a streamer of survey sensors. The crossline axis Y is generally orthogonal to the inline axis X. The vertical axis Z is generally orthogonal to both X and Y. In the land-based seismic surveying context, the inline axis X can be selected to be any horizontal direction, while the crossline axis Y can be any axis that is generally orthogonal to X.

In some examples, a rotational sensor can be a multi-component rotational sensor that is able to provide measurements of rotation rates around multiple orthogonal axes (e.g., $R_X$ about the inline axis X, $R_Y$ about the crossline axis Y, and $R_Z$ about the vertical axis Z).

In alternative implementations, instead of using a rotational sensor to measure rotation data, the rotation data can be derived from measurements (referred to as "vectorial data" or "translational data") of at least two closely-spaced apart seismic sensors used for measuring a seismic wavefield component along a particular direction, such as the vertical direction Z. Rotation data can be derived from the vectorial data of closely-based seismic sensors that are within some predefined distance of each other.

Rotation data can be used for various purposes. In some applications, rotation data can be used to provide noise attenuation in measured translational data. One type of noise includes horizontal propagation noise such as ground roll noise, which can refer to seismic waves produced by seismic sources or other sources such as moving cars, engines, pump and natural phenomena such as wind and ocean waves that travel generally horizontally along an earth surface towards seismic sensors. Other types of horizontal noise include flexural waves or extensional waves. Yet another type of noise includes an airwave, which is a horizontal wave that propagates at the air-water interface in a marine survey context. The rotation data can be used as a noise reference to remove the noise component of measured translational data.

Another application of rotation data is for decomposition of translational data into P and S wavefields. A P wavefield is a compression wave, while an S wavefield is a shear wave. The P wavefield extends in the direction of propagation of a seismic wave, while the S wavefield extends in a direction generally perpendicular to the direction of propagation of the seismic wave. Separation of the P wavefield and S wavefield is based on the acquired translational data and the rotation data.

Yet another application of rotation data is to perform interpolation of the translational data at points between seismic sensors. Interpolation involves acquiring translational data from at least two seismic sensors, and using rotational data to produce interpolated data between the two seismic sensors.

The sensors used to acquire translational data and rotation data can use different technologies and thus can have different impulse responses. For example, a rotational sensor records change in rotation over time, while a translational survey sensor records ground displacement (or velocity or acceleration) over time. To compensate for the different responses of rotation sensors and translational survey sensors, calibration of the data acquired by such sensors is performed.

Although reference is made to acquiring rotation data by a rotational sensor, different implementations can derive rotation data from measurements of at least two closely-spaced apart seismic sensors, as noted above. In such implementations, calibration can be applied to rotation data acquired by closely-spaced apart seismic sensors.

FIG. 1 is a schematic diagram of an arrangement of sensor assemblies (sensor stations) 100 that are used for land-based seismic surveying. Note that techniques or mechanisms can also be applied in marine surveying arrangements. The sensor assemblies 100 are deployed on a ground surface 108 (in a row or in an array or in another pattern). A sensor assembly 100 being "on" a ground surface means that the sensor assembly 100 is either provided on and over the ground surface, or buried (fully or partially) underneath the ground surface such that the sensor assembly 100 is with 10 meters of the ground surface. The ground surface 108 is above a subterranean structure 102 that contains at least one subterranean element 106 of interest (e.g., hydrocarbon reservoir, freshwater aquifer, gas injection zone, etc.). One or more seismic sources 104, which can be vibrators, air guns, explosive devices, and so forth, are deployed in a survey field in which the sensor assemblies 100 are located. The one or more seismic sources 104 are also provided on the ground surface 108.

Activation of the seismic sources 104 causes seismic waves to be propagated into the subterranean structure 102. Alternatively, instead of using controlled seismic sources as noted above to provide controlled source or active surveys, techniques according to some implementations can be used in the context of passive surveys. Passive surveys use the sensor assemblies 100 to perform one or more of the following: (micro)earthquake monitoring; hydro-frac monitoring where microearthquakes are observed due to rock failure caused by fluids that are actively injected into the subsurface (such as to perform subterranean fracturing); and so forth.

Seismic waves reflected from the subterranean structure 102 (and from the subterranean element 106 of interest) are propagated upwardly towards the sensor assemblies 100. Seismic sensors 112 (e.g., geophones, accelerometers, etc.) in the corresponding sensor assemblies 100 measure the seismic waves reflected from the subterranean structure 102.

Moreover, in accordance with some implementations, the sensor assemblies 100 further include rotational sensors 114 that are designed to measure rotation data.

Although a sensor assembly 100 is depicted as including both a seismic sensor 112 and a rotational sensor 114, note that in alternative implementations, the seismic sensors 112 and rotational sensors 114 can be included in separate sensor assemblies. In either case, however, a seismic sensor and a corresponding associated rotational sensor are considered to be collocated—multiple sensors are "collocated" if they are each located generally in the same location, or they are located near each other to within some predefined distance, e.g., less than 5 meters, of each other.

In some implementations, the sensor assemblies 100 are interconnected by an electrical cable 110 to a control system 116. Alternatively, instead of connecting the sensor assemblies 100 by the electrical cable 110, the sensor assemblies 100 can communicate wirelessly with the control system 116. In some examples, intermediate routers or concentrators may be provided at intermediate points of the network of sensor assemblies 100 to enable communication between the sensor assemblies 100 and the control system 116.

The control system 116 shown in FIG. 1 further includes processing software 120 that is executable on one or more processors 122. The processor(s) 122 is (are) connected to storage media 124 (e.g. one or more disk-based storage devices and/or one or more memory devices). In the example of FIG. 1, the storage media 124 is used to store translational data 126 communicated from the seismic sensors 112 of the sensor assemblies 100 to the control system 116, and to store rotation data 128 communicated from the rotational sensors 114.

In operation, the processing software 120 is used to process the translational data 126 and the rotation data 128. In some embodiments, the processing software 120 is able to determine a calibration operator based on the rotation data and translational data. The calibration operator is useable to relatively calibrate the rotation data and the translational data (discussed in further detail below). The calibration operator can be used to calibrate the rotation data, or the translational data, or both the rotation data and translational data. In some implementations, the calibration operator can be a transfer function between a sensor used to obtain rotation data and a sensor used to obtain translational data. In other implementations, the calibration operator is represented as a scalar coefficient. The calibration operator is dependent upon the characteristics of a sensor assembly used to acquire the translational data and rotation data, as well as based on a coupling of the sensor assembly with a ground surface.

Figure 2:
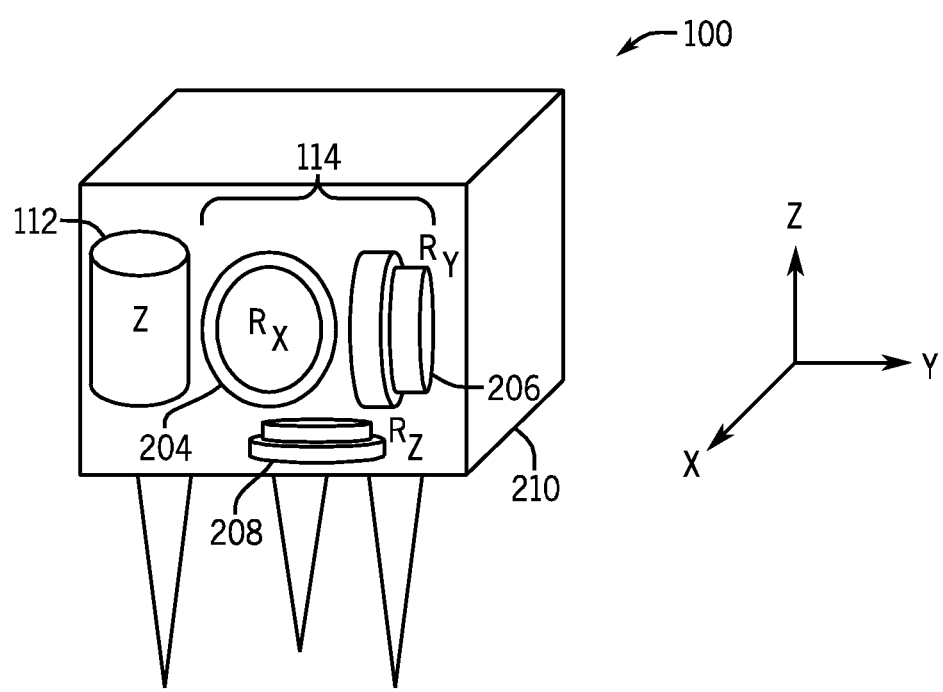
FIG. 2 is a schematic diagram of a sensor assembly according to some embodiments.

FIG. 2 illustrates an example sensor assembly (or sensor station) 100, according to some examples. The sensor assembly 100 can include a seismic sensor 112, which can be a particle motion sensor (e.g., geophone or accelerometer) to sense particle velocity along a particular axis, such as the Z axis. In alternative examples, the sensor assembly 100 can additionally or alternatively include particle motion sensors to sense particle velocity along a horizontal axis, such as the X or Y axis. In addition, the sensor assembly 100 includes a first rotational sensor 204 that is oriented to measure a rate of rotation ($R_X$) about the inline axis (X axis), and a second rotational sensor 206 that is oriented to measure a rate of rotation ($R_Y$) about the crossline axis (Y axis). Also, in some examples, the sensor assembly 100 can further include a rotational sensor 208 to measure a vertical rate of rotation ($R_Z$) about the vertical axis (Z axis). In other examples, the sensor assembly 100 can include less than all of the rotational sensors 204 and 206. The sensor assembly 100 has a housing 210 that contains the sensors 112, 204, 206, and 208.

In further alternative examples where rotation data is derived from Z component particle motion seismic data measured by closely-spaced apart seismic sensors, as discussed above, the rotational sensors 204, 206, and 208 can be omitted.

Figure 3:
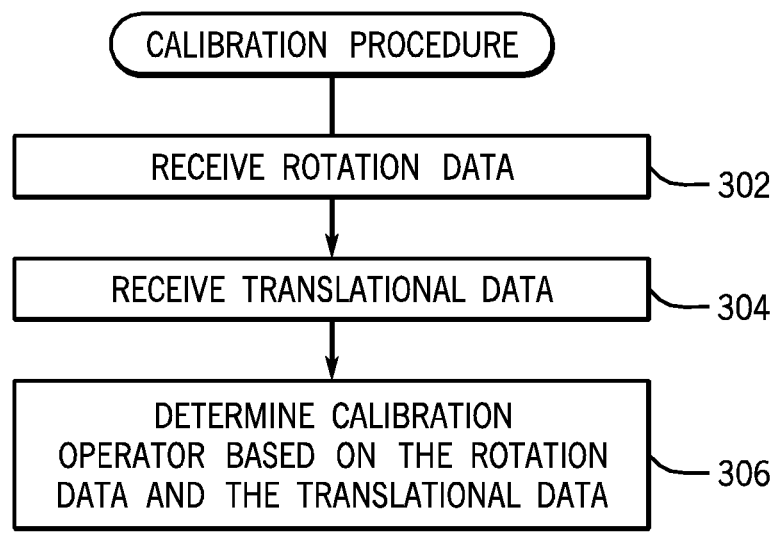
FIGS. 3-6 are flow diagrams of workflows to perform calibration of rotation data and translational data, according to various embodiments.

FIG. 3 is a flow diagram of a process according to some implementations. The process can be performed by the processing software 120 of FIG. 1, for example, or by some other entity. The process receives (at 302) rotation data based on measurement from at least one sensor. In some examples, the at least one sensor can include a rotational sensor. In other examples, the measurement from the at least one sensor can include measurements of translational data from at least two seismic sensors that are closely spaced apart, with the rotation data derived based on the measurements of the translational data from the two closely spaced apart seismic sensors.

The process also receives (at 304) translational data from a seismic sensor. The process then determines (at 306) a calibration operator based on the rotation data and the translational data. The calibration operator is useable to relatively calibrate the rotation data and the translational data (e.g., the calibration operator can calibrate the rotation data, or the calibration operator can calibrate the translational data, or the calibration operator can calibrate both the rotation data and the translational data). The calibration operator can be applied by the control system 116, or alternatively, the calibration operator can be sent by the control system 116 to another control system for application of the calibration operator to rotation data and/or translational data.

Although FIG. 3 refers to a process in which the calibration operator is determined based on rotation data acquired by one rotational sensor and translational data acquired by one seismic sensor, it is noted that in alternative implementations, the calibration operator can be determined based on rotation data and translational data acquired by multiple rotational sensors and seismic sensors.

The following provides further details according to some implementations.

Taking into account the free surface effect (including reflection and conversion at an interface, such as a land surface or seafloor, at which the sensors are located), it can be shown that the time differentiated crossline rotational data $R_Y$ (around the crossline horizontal axis Y) is proportional to the inline (X) spatial derivative of the vertical translational data $U_Z$:

$$K_Y \frac{\partial R_Y}{\partial t} = \frac{\partial U_Z}{\partial X} = \frac{U_Z(X + \partial X/2, Y) - U_Z(X - \partial X/2, Y)}{\partial X}, \quad \text{(Eq. 1)}$$

where $K_Y$ is the calibration operator for the $R_Y$ rotation rate data, taking the vertical seismic sensor (that measures $U_Z$, the vertical acceleration) as the reference data. The calibration operator $K_Y$ may be a frequency-dependent operator (e.g., wavelet) or may be approximated by a scalar coefficient.

The time differentiated inline rotational data $R_X$ (about the inline horizontal axis X) is proportional to the crossline (Y) spatial derivative of the vertical translation data $U_Z$:

$$K_X \frac{\partial R_X}{\partial t} = \frac{\partial U_Z}{\partial Y} = \frac{U_Z(X, Y + \partial Y/2) - U_Z(X, Y - \partial Y/2)}{\partial Y}, \quad \text{(Eq. 2)}$$

where $K_X$ is the calibration operator for the $R_X$ rotation data, taking the vertical seismic sensor (that measures $U_Z$) as the reference data.

The vertical rotation data $R_Z$ (around the vertical axis Z) is proportional to:

$$K_Z \frac{\partial R_Z}{\partial t} = \frac{\partial U_X}{\partial Y} - \frac{\partial U_Y}{\partial X}, \quad \text{(Eq. 3)}$$

where $K_Z$ is the calibration operator for the $R_Z$ rotation data.

Although the foregoing refers to calibration operators $K_X$ and $K_Y$ as calibration operators for respective $R_X$ and $R_Y$ rotation data, it is noted that in other implementations, the calibration operators can be produced for the translational data (e.g. $U_Z$) rather than for the rotation data. As yet other examples, calibration operators can be provided for both rotation data and translational data.

Note that in Eqs. 1-3, $\partial X$ and $\partial Y$ are relatively small distances compared to the wavelength of the dominant translational data of interest. The distances $\partial X$ and $\partial Y$ represent distances between sensor assemblies (e.g. 100 in FIG. 1) used to acquire $U_Z$. Thus, Eqs. 1-3 can be used to compute the calibration operators if a pattern of sensor assemblies are dense enough (having spacing offsets $\partial X$ and $\partial Y$ each less than some predefined fraction of the wavelength of the dominant translational data of interest). As explained further below, if the spacing offsets between sensor assemblies are not sufficiently small, then the following equations can be used. Eqs. 1-3 can be rewritten as:

$$K_Y R_Y = p_X U_Z, \quad \text{(Eq. 4)}$$

$$K_X R_X = p_Y U_Z, \text{ and} \quad \text{(Eq. 5)}$$

$$K_Z R_Z = p_Y U_X - p_X U_Y, \quad \text{(Eq. 6)}$$

where $p_X$ and $p_Y$ are the inline and crossline horizontal slownesses (slowness is an inverse of the apparent velocity in the X or Y direction, respectively).

The following describes a number of techniques to compute calibration operators.

A first technique involves use of Eqs. 1-3 to compute respective calibration operators. It is assumed that the sensors for obtain the translational data Z and rotation data $R_X$, $R_Y$ are collocated in a sensor assembly (such as 100 in FIG. 2). The distances $\partial X$ and $\partial Y$ represent the spatial inline and crossline sampling. It is assumed that the $\partial X$ and $\partial Y$ sampling offsets between sensor assemblies are sufficiently small (as compared to the wavelength of the translational data of interest, which can be less than half of the shortest wavelength of interest) such that Eqs. 1-3 can be used.

According to Eq. 1, the $K_Y$ calibration operator can be directly estimated from the ratio $\partial R_Y/\partial t$ and $\partial U_Z/\partial X$, focusing on the unaliased part of the acquired data from the sensor assemblies. The unaliased part of the acquired data includes data acquired by sensor assemblies that are sufficiently close together. Aliasing refers to an effect that causes different measured signals to become indistinguishable when insufficiently sampled. Typically, aliasing can occur if the spacing (represented by $\partial X$ and $\partial Y$) between successive sensor assemblies in either the X or Y direction is more than or equal to half the distance that is equal to the shortest wavelength of interest.

In the first technique, aliased events are removed from both the $R_Y$ and $U_Z$ common-shot gather (CSG) data, before computing the ratio according to Eq. 1. A common shot gather refers to a collection of survey data acquired by various survey sensors in response to a single shot (single activation of a survey source).

According to the first technique, the local ratio for a given trace (survey data acquired by a particular sensor assembly) can produce the calibration operator $K_Y$ at a particular location of the sensor assembly.

Figure 4:
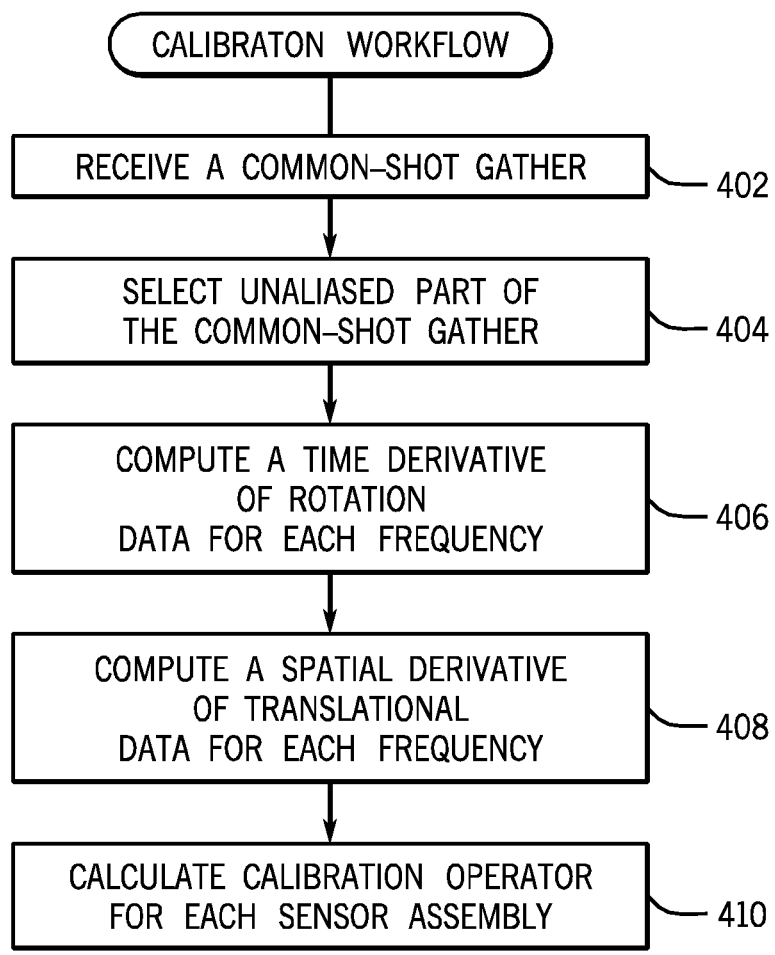

FIG. 4 is a flow diagram of a calibration workflow (according to the first technique) that uses a local ratio as discussed above for computing a calibration operator. The FIG. 4 workflow receives (at 402) a common-shot gather, which contains rotation data (e.g., $R_Y$) and translational data (e.g., $U_Z$) acquired by multiple sensor assemblies in response to a single shot (single activation of a survey source). The workflow selects (at 404) an unaliased part of the common-shot gather, where the unaliased part includes data acquired by sensor assemblies with spacing (between successive sensor assemblies) less than or equal to half the shortest wavelength of interest. Any aliased part of the common-shot gather is discarded and not used for producing a calibration operator.

There can be several ways of removing aliasing. For example, one way involves applying a low-pass filter on the data to select only frequencies below $f_{max}$ (beyond which the data are aliased). Alternatively, when arrays of sensors are present, an f-k filter (where f is frequency and k is wavenumber) can be applied to extract the unaliased data (data having relatively low frequencies). In other examples, one can mute the slow events (typically the ground-roll noise) in a common-shot gather, such that the minimum apparent velocity in the data is larger and higher frequencies can be used. Another approach can include applying interpolation schemes to reduce the spatial sampling, therefore allowing the use of higher frequency content.

The FIG. 4 calibration workflow then computes (at 406) the value $\partial R_Y/\partial t$ (a time derivative of the rotation data) for each frequency of interest, and computes (at 408) the value $\partial U_Z/\partial X$ (a spatial derivative of the translational data) for each frequency of interest. Then, for each trace (sensor assembly), the calibration operator $K_Y$ is calculated (at 410). Note that a trace refers to data acquired by a particular sensor assembly. Thus, for multiple traces, multiple corresponding calibration operators ($K_Y$) are computed at 410.

The FIG. 4 calibration workflow can be re-iterated for multiple shots (multiple activations of a seismic source)—the results obtained in response to respective shots should be redundant. In other words, the calibration operator, for a given sensor assembly, should be the same across different shots. However, in practice, the calibration operators produced for different shots may not be the same. According to some implementations, an inversion procedure may be implemented to integrate the results obtained from several shots but at a given sensor assembly location. When simultaneously solved for multiple shots, a system of linear equations may be solved (as a least squares problem for example). This may be equivalent to computing the global ratio (a single operator) between $\partial R_Y/\partial t$ over a $\partial U_Z/\partial X$, reordered as common-receiver gathers (CRGs). With CRGs, the ratio is not computed in a trace-by-trace manner. In such case, the CRG data can eventually be trace-by-trace scaled-normalized (with same scaling on both $\partial R_Y/\partial t$ and $\partial U_Z/\partial X$ to prevent the ratio from being predominately estimated from the strongest amplitude shots, such as shots at shorter offsets).

The approach according to the FIG. 4 calibration workflow can employ just two adjacent seismic sensors next to a rotational sensor (in other words, a large array of sensors does not have to be used). However, the distance between the two seismic sensors should be relatively small, e.g., $<V/2 \cdot f_{max}$, where $f_{max}$ is the maximum frequency (of the translational data of interest) and V is the velocity of the slowest event to be analyzed.

A similar procedure as shown in FIG. 4 can be applied to solve for the calibration operator $K_X$, based on Eq. 2, or for the calibration operator $K_Z$, based on Eq. 3.

Figure 5:
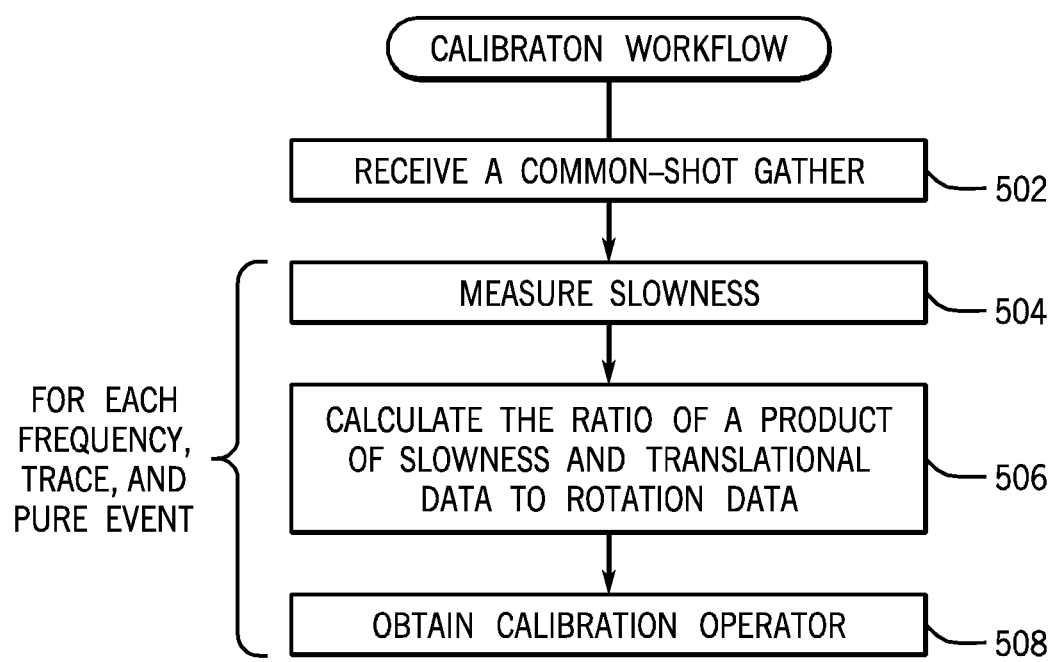

If the spatial sampling (determined by $\partial X$ and $\partial Y$) is not dense enough to enable the accurate calculation of the spatial derivative(s) for the FIG. 4 calibration workflow (in other words, the data obtained from the sensor assemblies does not have an unaliased part), then a second technique for deriving a calibration operator is used. The second technique employs Eq. 4, in which the calibration operator $K_Y$ is given by the ratio $p_X U_Z$ over $R_Y$. An example of such a calibration workflow is shown in FIG. 5. The FIG. 5 calibration workflow receives (at 502) a common-shot gather (including rotation data $R_Y$ and translational data $U_Z$ for example). The calibration operator $K_Y$ is calculated for different frequencies and for different traces (different sensor assembly locations). Moreover, a pure event (P, S, or Rayleigh wave, for example) is also identified (isolated), where the identified event is free of overlap with other types of events. Thus, as shown in FIG. 5, tasks 504, 506, and 508 are performed for each different frequency, for each different trace, and for each pure event. Task 504 involves measuring the horizontal slowness $p_X$ of the identified event. This can be accomplished using several techniques as, for example, semblance analysis (which is an optimization process in which the seismic data is aligned along different slownesses), local frequency-wavenumber analysis, or eventually manual picking. The above techniques aim to determine the apparent velocity of a seismic event, by tracking the arrival times between multiple traces.

The FIG. 5 calibration workflow next calculates (at 506) the following ratio $R_Y/p_X U_Z$, to obtain (at 508) the calibration operator $K_Y$ according to Eq. 4.

A similar calibration workflow can be used for computing the calibration operator $K_X$ according to Eq. 5 and/or the calibration operator $K_Z$ according to Eq. 6.

Here the FIG. 5 calibration workflow may be repeated for several pure events (as well as multiple traces and frequencies). An inversion procedure (least squares inversion, for example) may be implemented to integrate the results obtained from several events in several shot gathers but at a given sensor assembly location. A system of linear equations may be solved when including several shots and/or several events.

According to a third technique, if a relatively large array of unaliased data (or data in which the aliased part has been previously removed) is available, then the selection of pure events as performed in the FIG. 5 calibration workflow can be avoided by mapping the acquired data to a target domain such as a tau-p domain (where tau is intercept time and p is horizontal slowness) or an f-k domain (where f is frequency and k is wavenumber).

Figure 6:
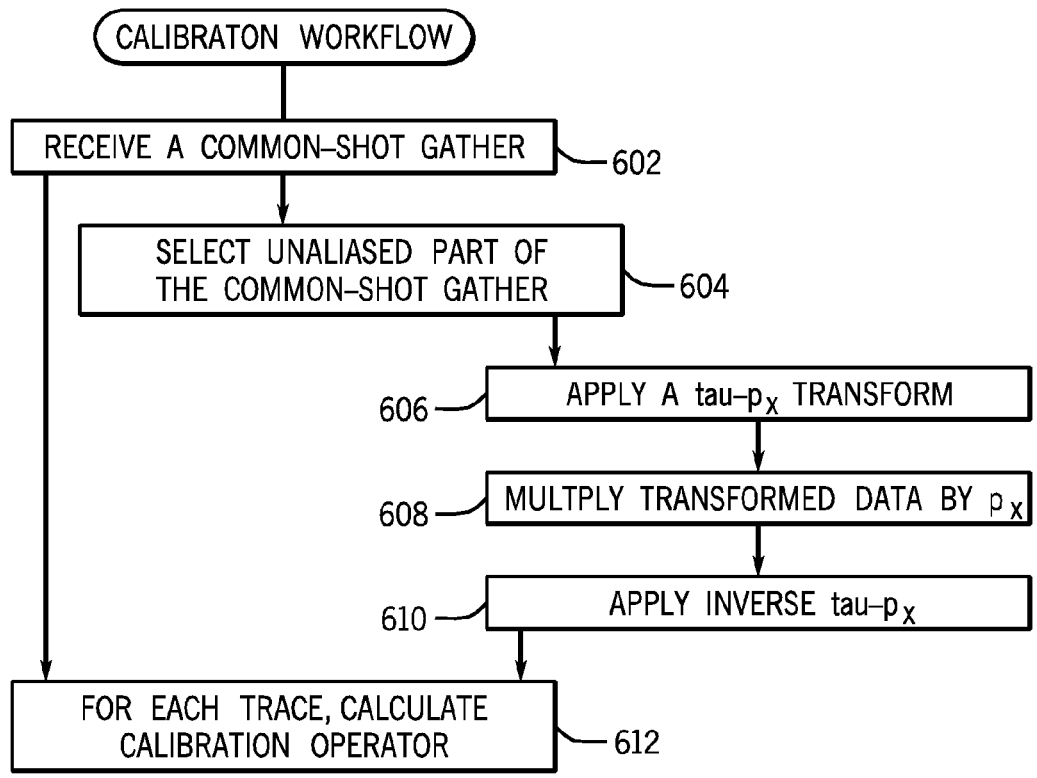

An example of a calibration workflow in the tau-p domain is shown in FIG. 6. A similar workflow can be provided for the f-k domain in other implementations. The workflow of FIG. 6 can also be performed by the processing software 120 of FIG. 1, or by some other entity. The calibration workflow receives (at 602) acquired data in a common-shot gather, where the acquired data can include $R_Y$ and $U_Z$, as examples.

An unaliased part of the received CSG data is selected (at 604). The calibration workflow next applies (at 606) a tau-$p_x$ transform of the translational data $U_Z$. Applying the tau-$p_x$ transform on the translational data $U_Z$ involves mapping the translational data from the time-offset domain (data at different time points and at different offsets between source and sensor, as acquired in the common-shot gather) to the tau-p domain.

The calibration workflow next multiples (at 608) the transformed data by $p_x$ in the slowness domain. Next, the workflow applies (at 610) an inverse tau-$p_x$ transform on the output of task 608 to produce $p_xU_Z$. Then, the calibration operator $K_Y$ (for each sensor assembly) can be estimated by computing the $p_xU_Z$ over $R_Y$ ratio in a trace-by-trace manner, without event selection or time-windowing (except in terms of aliasing).

The FIG. 6 workflow procedure can be repeated for several shots, yielding a system of linear equations to be solved. This may be equivalent to estimating the single-global matching operator between $p_xU_Z$ and $R_Y$ (reordered as CRGs).

A similar workflow can be used to compute the calibration operator $K_X$ and/or $K_Z$.

According to other implementations, another technique can estimate the slowness at a given sensor assembly in a different way (for use in one or more of Eqs. 4-6). This workflow can determine, from aliased data, a group-velocity for a given survey area (a velocity representing the velocity of a given seismic event in the survey area). Such group-velocity can be determined when the shot time (time of activation of the seismic source) and shot location (location of the seismic source) is known. Once the local slowness is estimated at a given sensor assembly, then the ratio $p_xU_Z/R_Y$ can be computed according to Eq. 4 to obtain the calibration operator $K_Y$. The calibration operators $K_X$ and $K_Z$ can be similarly computed to according to Eqs. 5 and 6.

In some cases, because the crossline spatial sampling can be less dense than the inline sampling (i.e., $\partial Y$ is larger than $\partial X$), the translational data may be too aliased in the Y direction and the estimation of $K_X$ may become difficult. However, since the three rotational components are collocated in a sensor assembly in some implementations, and can use the same technology, it can be assumed that the three rotational components have similar coupling with the ground surface and therefore the same impulse responses. As a consequence, $K_X$, $K_Y$ and $K_Z$ can be assumed to be generally equal so that just one calibration operator (e.g. $K_Y$) has to be calculated.

Modules (e.g. 120 in FIG. 1) for performing tasks discussed above (including the calibration workflows of FIGS. 3-6) are loaded for execution on a processor or processors (such as 122 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   placing a plurality of seismic sensors proximate to the earth surface, each of the seismic sensors having a first translational motion sensor, a first rotation sensor and a second rotation sensor;
   receiving ground-roll rotation data based on measurement by the rotation sensors;
   receiving translational data from the translational seismic sensors; and
   determining a calibration operator based on the ground-roll rotation data and translational data, wherein the calibration operator is useable to relatively calibrate the ground-roll rotation data and the translational data.

2. The method of claim 1, wherein determining the calibration operator is based on a ratio between a spatial derivative of the translational data and a time derivative of the ground-roll rotation data.

3. The method of claim 1, further comprising:
   determining a slowness of a wavefield that is being surveyed using the seismic sensor,
   wherein determining the calibration operator is further based on the slowness.

4. The method of claim 3, wherein determining the calibration operator is based on a ratio between the ground-roll rotation data and a product of the slowness and the translational data.

5. The method of claim 4, further comprising determining the slowness for a given location of a sensor assembly.

6. The method of claim 4, further comprising determining the product of the slowness and the translational data based on applying a tau-p transform of the translational data.

7. The method of claim 1, wherein the ground-roll rotation data is received from the rotational sensors.

8. The method of claim 7, wherein the calibration operator is dependent on a characteristic of a sensor assembly including the rotational sensors and the seismic sensor.

9. The method of claim 8, wherein the calibration operator is further dependent on a coupling of the sensor assembly with a ground surface.

10. The method of claim 1, wherein determining the calibration operator is based on the translational data acquired by the seismic sensor in response to a single shot.

11. The method of claim 1, wherein determining the calibration operator comprises determining a transfer function between the at least one sensor and the seismic sensor.

12. The method of claim 1, wherein the calibration operator is a scalar coefficient or a frequency dependent operator and is determined for at least one frequency.

13. A system comprising:
at least one storage medium to store ground-roll rotation data and translational data acquired based on measurement from a plurality of seismic sensors, each seismic sensor having a translational movement sensor, a first rotation sensors and a second rotation sensor; and
at least one processor to:
determine a calibration operator based on the ground-roll rotation data and translational data, wherein the calibration operator is useable to relatively calibrate the ground-roll rotation data and the translational data.

14. The system of claim 13, wherein determination of the calibration operator is based on use of the translational data acquired in response to a single shot.

15. The system of claim 13, wherein determination of the calibration operator is based on use of the translational data acquired in response to plural shots.

16. The system of claim 13, wherein the calibration operator is for a first axis, and wherein the at least one processor is to use the calibration operator for the first axis as a calibration operator for a second, different axis.

17. The system of claim 13, wherein determination of the calibration operator is based on a ratio of a time derivative of the rotation data and a spatial derivative of the translational data.

18. The system of claim 13, wherein the at least one processor is to further determine a slowness of an event measured by the seismic sensor, and wherein determination of the calibration operator is further based on the slowness.

19. An article comprising at least one non-transitory machine-readable storage medium storing instructions that upon execution cause a system to:
receive ground-roll rotation data based on measurement by a plurality of seismic sensors, each seismic sensor having a translational sensor, a first rotation sensor and a second rotation sensor;
receive translational data from the plurality of seismic sensors; and
determine a calibration operator based on the ground-roll rotation data and translational data, wherein the calibration operator is useable to relatively calibrate the ground-roll rotation data and the translational data.

20. The article of claim 19, wherein the ground-roll rotation data is received from a rotational sensor.

* * * * *